United States Patent
Kitayama et al.

(10) Patent No.: US 8,420,736 B2
(45) Date of Patent: *Apr. 16, 2013

(54) THERMOPLASTIC RESIN COMPOSITION AND MOLDED BODY THEREOF

(75) Inventors: Fuminobu Kitayama, Takasago (JP); Kouhei Fujimoto, Settsu (JP); Yuya Manabe, Takasago (JP)

(73) Assignee: Kaneka Corporation, Osaka-shi, Osaka (JP)

( * ) Notice: Subject to any disclaimer, the term of this patent is extended or adjusted under 35 U.S.C. 154(b) by 79 days.

This patent is subject to a terminal disclaimer.

(21) Appl. No.: 12/823,787

(22) Filed: Jun. 25, 2010

(65) Prior Publication Data

US 2010/0331491 A1 Dec. 30, 2010

Related U.S. Application Data

(63) Continuation of application No. PCT/JP2010/058704, filed on May 24, 2010.

(60) Provisional application No. 61/222,663, filed on Jul. 2, 2009.

(30) Foreign Application Priority Data

Jun. 25, 2009 (JP) ................. 2009-151348

(51) Int. Cl.
*C08L 33/10* (2006.01)
*C08L 51/04* (2006.01)
*C08F 265/06* (2006.01)

(52) U.S. Cl.
USPC ............. 525/66; 525/67; 525/78; 525/79; 525/80; 525/85

(58) Field of Classification Search ......... 525/80, 525/81, 82, 85, 66, 67, 78, 79
See application file for complete search history.

(56) References Cited

U.S. PATENT DOCUMENTS

| | | | | |
|---|---|---|---|---|
| 4,120,833 A | * | 10/1978 | Purvis et al. | ............... 521/81 |
| 4,542,185 A | | 9/1985 | Meunier | |
| 6,686,411 B2 | | 2/2004 | Iguchi et al. | |
| 2002/0165311 A1 | | 11/2002 | Iguchi et al. | |
| 2003/0225290 A1 | | 12/2003 | Manzer | |
| 2004/0039110 A1 | * | 2/2004 | Coyle et al. | ............... 524/568 |
| 2004/0152821 A1 | | 8/2004 | Saegusa et al. | |
| 2008/0004402 A1 | * | 1/2008 | Borbely et al. | ............... 525/242 |

FOREIGN PATENT DOCUMENTS

| | | |
|---|---|---|
| JP | 4-033907 A | 2/1992 |
| JP | 4-145110 A | 5/1992 |
| JP | 7-003168 A | 1/1995 |
| JP | 10-025321 A | 1/1998 |
| JP | 2002-363372 A | 12/2002 |
| JP | 2004-123795 A | 4/2004 |
| JP | 2007-302842 A | 11/2007 |
| WO | 01/72896 A1 | 10/2001 |
| WO | 2009-084555 A1 | 7/2009 |

OTHER PUBLICATIONS

English Translation of International Search Report of PCT/JP2010/058704 dated Jun. 15, 2010.
Supplementary European Search Report dated Mar. 16, 2011, issued in corresponding European Patent Application No. 08868463.4.
International Search Report of PCT/JP2008/073508, date of mailing Mar. 31, 2009.
Office Action of Jan. 4, 2012 issued in U.S. Appl. No. 12/810,919.
Final Office Action dated Jul. 30, 2012, issued in corresponding U.S. Appl. No. 12/810,919 (Hirotsugu Yamada).
Supplementary European Search Report dated Nov. 20, 2012, issued in corresponding European Patent Application No. 10791926.8.

* cited by examiner

*Primary Examiner* — Jeffrey Mullis
(74) *Attorney, Agent, or Firm* — Westerman, Hattori, Daniels & Adrian, LLP

(57) ABSTRACT

An object of the present invention is to provide a thermoplastic resin composition capable of improving impact resistance and surface gloss of a molded article, and a molded article thereof. A thermoplastic resin composition of the present invention is comprising 100 parts by weight of a thermoplastic resin (a) and 0.5 to 30 parts by weight of a core-shell polymer composition (b), wherein the core-shell polymer composition (b) is obtained by polymerizing the shell-constituting components in the presence of a core obtained by polymerizing a monomer mixture (100% by weight in total) of 70% to 99.95% by weight of an alkyl acrylate having an alkyl group of 2 to 18 carbon atoms, 0.05% to 10% by weight of a polyfunctional monomer, and 0% to 20% by weight of a monomer copolymerizable with the alkyl acrylate and the polyfunctional monomer, and the polyfunctional monomers contains at least a compound having a plurality of same radically polymerizable functional groups in the molecule thereof.

8 Claims, No Drawings

THERMOPLASTIC RESIN COMPOSITION AND MOLDED BODY THEREOF

TECHNICAL FIELD

The invention relates to a thermoplastic resin composition capable of improving the strength and surface gloss of a molded article, and a molded article thereof.

BACKGROUND ART

Since a vinyl chloride based resin is inexpensive and excellent in mechanical strength, weathering resistance, and chemical resistance, it has been used for various applications including building materials and housing materials. However, since the vinyl chloride based resin alone has no sufficient impact resistance strength, a method for adding a graft copolymer obtained by an emulsion polymerization or the like as an impact resistance modifier is currently widely used.

On the other hand, in recent years, in addition to the strength property such as impact resistance, appearance of a molded article such as surface gloss has been regarded to be important and particularly, in a window frame molded article, it has been strongly desired to satisfy at high level both physical properties: that is, strength and gloss.

As a method for improving the impact resistance, disclosed is a method of adding, for example, a diene type or acrylate type soft rubber-containing graft copolymer.

Patent References 1 and 2 disclose graft copolymers containing graft components as shell parts and accompanying free polymers wherein the graft components are soluble in methyl ethyl ketone, insoluble in methanol in core-shell polymer compositions, and having a specific viscosity (lisp) of 0.19 or higher measured at 30° C. in form of 0.2 g/100 ml acetone solution thereof, that is, polymer chains with high molecular weights; however they are techniques aiming to improve the weathering resistance, impact resistance, and secondary processability and the effect of improving gloss of a molded article is not mentioned, and these techniques are not sufficient as a method for satisfying both of gloss and impact resistance at high levels.

Patent Reference 3 discloses improvement of impact resistance by a graft copolymer containing, as a polyfunctional crosslinking agent, polyethylene glycol dimethacrylate having a main chain composed of —$CH_2$—$CH_2$—O— as a repeating unit; however Patent Reference 3 does not mention the effect of improving the gloss of a molded article, and similarly to Patent References 1 and 2, is not sufficient as a method for satisfying both of gloss and impact resistance at high levels, as described above, and also it cannot be said that impact resistance is sufficient.

A filler such as calcium carbonate is compounded to a vinyl chloride based resin composition for building fields and it is possible to improve the surface gloss to a certain extent by decreasing the compounding amount thereof; however it undesirably leads to rise of cost. Although the surface gloss can be improved also by increasing the molding temperature, there are many problems such as occurrence of thermal decomposition of vinyl chloride. Moreover, gloss can be improved by using, as a processing aid, a large quantity of a copolymer containing methyl methacrylate as a main component; however, the torque is increased due to the increase of melt viscosity and there is another problem of decrease of impact resistance.

That is, among conventionally known methods, there is not the method for improving both of gloss and impact resistance to high levels, which are particularly desired in recent years, and thus it has been desired to find the improvement method.

Accordingly, development of a graft copolymer satisfying both impact resistance and surface gloss has been desired.

Patent Reference 1: Japanese Patent Laid-open Publication No. 4-033907

Patent Reference 2: Japanese Patent Laid-open Publication No. 2002-363372

Patent Reference 2: Japanese Patent Laid-open Publication No. 7-3168

DISCLOSURE OF THE PRESENT INVENTION

Problems that the Present Invention is to Solved

An object of the present invention is to provide a thermoplastic resin composition capable of improving the strength and surface gloss of a molded article, and a molded article thereof.

Means for Solving the Problems

In view of the above state of the art, the present inventors have made various investigations to solve the above-mentioned problems and have found that high impact resistance and good surface gloss can be obtained in a case where a graft polymer containing polyfunctional monomers consisted of 51% to 100% by weight of a compound having a plurality of same radically polymerizable functional groups in the molecule thereof and 0% to 49% by weight of a compound having a plurality of different radically polymerizable functional groups in the molecule thereof (the total amount of which is 100% by weight) is added to a thermoplastic resin represented by vinyl chloride as an impact resistance improver, and the finding has now led to completion of the present invention.

That is, the present invention relates to a thermoplastic resin composition comprising 100 parts by weight of a thermoplastic resin (a) and 0.5 to 30 parts by weight of a core-shell polymer composition (b), wherein the core-shell polymer composition (b) is obtained by polymerizing a shell-constituting component in the presence of a core obtained by polymerizing a core-constituting component, the core-constituting component contains 70% to 99.95% by weight of an alkyl acrylate having an alkyl group of 2 to 18 carbon atoms, 0.05% to 10% by weight of a polyfunctional monomer, and 0% to 20% by weight of a monomer copolymerizable with the alkyl acrylate and/or the polyfunctional monomer, the total amount of which is 100% by weight, 100% by weight of the polyfunctional monomer consists of 51% to 100% by weight of a compound having a plurality of same radically polymerizable functional groups in the molecule thereof and 0% to 49% by weight of a compound having a plurality of different radically polymerizable functional groups in the molecule thereof.

A preferred embodiment is the thermoplastic resin composition, wherein a main chain of the compound having a plurality of same radically polymerizable functional groups in the molecule thereof has a repeating structure composed mainly of alkylene glycol units and the number of repeating units of the repeating structure is 3 or higher in average.

A preferred embodiment is the thermoplastic resin composition, wherein the compound having a plurality of different radically polymerizable functional groups in the molecule thereof has an ally group.

A preferred embodiment is the thermoplastic resin composition, wherein the molecular weight of a component soluble in methyl ethyl ketone and insoluble in methanol of the core-shell polymer composition (b) is 500,000 or higher, and the content of the component is 5% to 20% in the core-shell polymer composition (b).

A preferred embodiment is the thermoplastic resin composition, wherein the core-shell polymer composition (b) contains 50% to 95% by weight of the core-constituting component and 5% to 50% by weight of the shell-constituting component, based on the total amount of the core-shell polymer composition (b) being 100% by weight. In this specification, the contents of the core-constituting component and the shell-constituting component can be regarded the same as the contents of the core polymer and the shell polymer in the core-shell polymer.

A preferred embodiment is the thermoplastic resin composition wherein the thermoplastic resin (a) is a vinyl chloride based resin.

Furthermore, a present invention relates to a molded article obtained by molding the thermoplastic resin composition.

A preferred embodiment is the molded article wherein the molded article is a window frame or a door frame.

A preferred embodiment is the molded article wherein the molded article is a siding.

Effects of the Invention

According to the graft copolymer of the invention, obtained are high impact resistance and good surface gloss in a case of being compounded as an impact resistance improver to a thermoplastic resin represented by vinyl chloride.

BEST MODE FOR CARRYING OUT THE INVENTION (Thermoplastic Resin Composition)

The thermoplastic resin composition of the invention is a thermoplastic resin composition containing 100 parts by weight of a thermoplastic resin (a) and 0.5 to 30 parts by weight of a core-shell polymer composition (b). The content of the core-shell polymer composition (b) is required to be 0.5 to 30 parts by weight in terms of the quality and cost; however it is preferably 0.5 to 20 parts by weight, more preferably 0.5 to 10 parts by weight. In a case the content exceeds 30 parts by weight, the effect of improving the impact resistance is sufficient; however qualities other than that, for example, mold processability may be deteriorated and cost may be raised.

To the thermoplastic resin composition of the invention may be properly added additives, if necessary, such as an antioxidant, a stabilizer, an ultraviolet absorbent, a pigment, an antistatic agent, a lubricant, a processing aid, or the like.

A molded article obtained by forming the thermoplastic resin composition of the invention as a material can be preferably used as a window frame, a door frame, or a siding.

(Stabilizer)

To prevent deterioration (discoloration and deterioration of mechanical and electrical properties) due to dehydrochlorination reaction by heat and ultraviolet as well as oxygen in processing or using, a vinyl chloride resin is generally used with a stabilizer. Such the stabilizer is classified mainly into a lead compound type stabilizer, a metal soap type stabilizer, an organotin type stabilizer and the like, and among them, the lead compound type stabilizer is often used since it is excellent in heat stability and electrical insulation property and inexpensive. However, recently, in applications for products to which human being touches, such as building materials and housing materials, in terms of health and environmental preservation, use of the lead compound type stabilizer tends to be reduced and as an alternative stabilizer, particularly a harmless CaZn type stabilizer among metal soap type stabilizers tends to be used. Accordingly, as the above-mentioned stabilizer, one or more kinds selected from lead compound type, organotin type, and metal soap type are preferable and in terms of health and environmental preservation, the organotin type and metal soap type are preferable, and the metal soap type is more preferable and CaZn type is particularly more preferable.

(Thermoplastic Resin (a))

The thermoplastic resin (a) that can be used in the invention preferably contains vinyl chloride based resin, (meth)acryl based resin, styrene based resin, carbonate based resin, amide based resin, ester based resin, olefin based resin, and the like.

Among them, in a case the graft copolymer of the invention is particularly used as an impact resistance improver of the vinyl chloride based resin, it can exhibit an excellent effect, and therefore, the vinyl chloride based resin is preferable. In this invention, the vinyl chloride based resin means a vinyl chloride homopolymer or a copolymer containing at least 70% by weight of a unit derived from vinyl chloride.

(Core-Shell Polymer Composition (b))

The core-shell polymer composition (b) of the invention is obtained by polymerizing a shell-constituting component in the presence of a core obtained by polymerizing a core-constituting component. In terms of attainment of good impact resistance and good surface gloss, the ratio of the core-constituting component and the shell-constituting component is preferably 50% to 95% by weight of the core-constituting component and 5% to 50% by weight of the shell-constituting component, more preferably 60% to 90% by weight of the core-constituting component and 10% to 40% by weight of the shell-constituting component, and particularly preferably 70% to 85% by weight of the core-constituting component and 15% to 30% by weight of the shell-constituting component, based on the total amount of the core-shell polymer composition (b) being 100% by weight.

The core-shell polymer composition (b) can be produced by, for example, an emulsion polymerization method, a suspension polymerization method, a micro-suspension polymerization method, a mini-emulsion polymerization method, a water-dispersion polymerization method and the like, in terms of easiness of structure control, the composition produced by an emulsion polymerization method can be suitably used.

The latex and particles of the core-shell polymer thus obtained are recovered as a powder by heat treatment, washing, dewatering, and drying steps, if necessary, after coagulation treatment such as salting-out, acid precipitation, and the like. The recovery method of a powder is not limited to the above-mentioned methods; however the core-shell polymer latex can be recovered also by, for example, spray drying.

The core-shell polymer composition (b) may contain an anti-caking agent in order to improve the blocking resistance of the powder, and an anionic surfactant polyvalent metal salt, inorganic particles, crosslinked polymers and/or silicone oil can be suitably used. Examples of the anionic surfactant polyvalent metal salt may include higher fatty acid salts, higher alcohol sulfuric acid ester salts, alkyl aryl sulfonic acid salts, and the like, but are not limited to these salts. Examples of the inorganic particles may include calcium carbonate, silicon dioxide, and the like, but are not limited to these compounds.

(Core)

The core of the core-shell polymer composition (b) of the invention is preferable to have a particle diameter of 0.05 to 0.3 μm in order to exhibit excellent impact resistance when a vinyl chloride type resin is used as the thermoplastic resin (a).

The core according to the present invention can be obtained by polymerizing a monomer mixture containing, as core-constituting components, 70% to 99.95% by weight of an alkyl acrylate having an alkyl group of 2 to 18 carbon atoms, 0.05% to 10% by weight of a polyfunctional monomer, and 0% to 20% by weight of a monomer copolymerizable with the alkyl acrylate and/or the polyfunctional monomer, the total amount of which is 100% by weight. In the invention, 100% by weight of the polyfunctional monomer is consisted of 51% to 100% by weight of a compound having a plurality of same radically polymerizable functional groups in the molecule thereof and 0% to 49% by weight of a compound having a plurality of different radically polymerizable functional groups in the molecule thereof. A high impact resistance improvement effect can be obtained by adjusting the content of the alkyl acrylate having an alkyl group of 2 to 18 carbon atoms to the above-mentioned range. The crosslinking degree of the core polymer, and the component amount and the molecular weight of so-called free polymers generated in the process of grafting the shell to the core can be set in the optimum range by adjusting the content of the polyfunctional monomer in the range and consequently, it is made possible to obtain a molded body with further improved strength, gloss and surface properties. Further, adjustment of the content of the monomer copolymerizable with the alkyl acrylate and/or the polyfunctional monomer to the range improves characteristics such as processibility (moldability) in a case where a vinyl chloride type resin is used as the thermoplastic resin (a). The content of the alkyl acrylate is preferably 97% to 99.5% by weight and the content of the polyfunctional monomer is preferably 0.5% to 5.0% by weight and more preferably 1.0% to 4.0% by weight. The upper limit of the content of the monomer is preferably 1.0% by weight. The compound having a plurality of same radically polymerizable functional groups in the molecule thereof and the compound having a plurality of different radically polymerizable functional groups in the molecule thereof may be respectively a single kind compound or two or more kinds of compounds in combination.

With respect to the polyfunctional monomer, in a case where the compound having a plurality of same radically polymerizable functional groups in the molecule thereof and the compound having a plurality of different radically polymerizable functional groups in the molecule thereof are used in combination, it is preferable to set the compound having a plurality of same radically polymerizable functional groups in the molecule thereof in a range of 80% to 99% by weight and the compound having a plurality of different radically polymerizable functional groups in the molecule thereof in a range of 1% to 20% by weight and it is more preferable to set the compound having a plurality of same radically polymerizable functional groups in the molecule thereof in a range of 90% to 99% by weight and the compound having a plurality of different radically polymerizable functional groups in the molecule thereof in a range of 1% to 10% by weight. It is supposed that the free polymer amount and the free polymer molecular weight can be set in proper ranges by adjusting the ratios as described above. Herein, the above-mentioned "radically polymerizable functional groups" means functional groups comprised of an ethylenic double bond and adjacent atoms. For example, in a case where the functional groups are classified into groups of allyl group, acrylate group, methacrylate group, and the like, the matter that the radically polymerizable functional groups are the "same" means that the group is the same and the matter that the radically polymerizable functional groups are "different" means that the group is different.

Particularly preferable combinations of the polyfunctional monomers are a combination of diacrylate having 3 repeating units of polypropylene glycol (PPG(3)DA) and allyl methacrylate (AMA), a combination of diacrylate having 12 repeating units of polypropylene glycol (PPG(12)DA) and allyl methacrylate (AMA), and a combination of diacrylate having 3 repeating units of polytetramethylene glycol (PTMG(3)DA) and allyl methacrylate (AMA).

In the case of polymerization of the shell-constituting components in the presence of the core formed by polymerization of the polyfunctional monomer of the present invention as the core-constituting components, although the mechanism is not made clear, the shell-constituting components tend to form polymers with high molecular weights and such polymers with high molecular weights tend to be contained by themselves in the core-shell polymer composition (b) of the invention as so-called free polymers without grafting to the core and it is supposed that the high surface gloss, which is the effect of the invention, can be obtained due to these tendencies.

It is supposed that the characteristics of an increase in the molecular weight of the shell-constituting component polymer and its becoming the free polymers are derived from the equivalent reactivities of a plurality of double bonds contributing to the crosslinking of the compound having a plurality of same radically polymerizable functional groups in the molecule thereof, in which the compound is an essential component when polymerization of the shell-constituting component and a main component of the polyfunctional monomer of the present invention. And it is assumed that the grafting points where the shell is graft-bonded with the core are lessened as compared with those in a case of using a polyfunctional monomer such as allyl methacrylate, in which the reactivities of double bonds contributing to its crosslinking are not equivalent.

In the present invention, it is preferable to use the compound having a plurality of different radically polymerizable functional groups in the molecule thereof, which is an optional component and an accessory component of the polyfunctional monomer of the invention, as the polyfunctional monomer of the invention, in combination with the polyfunctional monomer having a plurality of same radically polymerizable functional groups in the molecule thereof. Because of such constitution, it is supposed that the increase in the molecular weight of the shell-constituting component polymer can be controlled owing to the compound having a plurality of same radically polymerizable functional groups in the molecule thereof, as described above. Further, because of the following reason, it is supposed that the surface properties of a molded body produced from the thermoplastic resin composition can be kept well.

That is, although the surface gloss of a molded body is improved due to the increase in the molecular weight of the shell-constituting component polymer, the melt viscosity is increased at the time of melting the thermoplastic resin composition in a molding device because of the increase in the molecular weight of the shell-constituting component polymer and it sometimes results in lost of the surface smoothness of the molded body. Therefore, it is supposed that use of the compound having a plurality of different radically polymerizable functional groups in the molecule thereof in combination for adjusting the molecular weight in a range for giving good surface gloss without deteriorating the surface properties of a molded body leads to a preferable result.

The linking group (main chain) of the compound having a plurality of same radically polymerizable functional groups in the molecule thereof has a repeating structure composed mainly of alkylene glycol units and the number of repeating units of the repeating structure is preferably 3 or higher and 30 or lower in average, more preferably 3 or higher and 12 or lower in average, furthermore preferably 3 or higher and 7 or lower in average, even more preferably 3 or higher and 5 or lower in average, and most preferably 3. It seems to make it possible to obtain a rubber which is highly crosslinked for showing a high impact resistance improvement effect, although the mechanism is not yet made clear. That is, the linking group (main chain) contains preferably 50% or higher and more preferably 75% or higher of a unit such as a propylene glycol unit, a tetramethylene glycol unit, an isobutylene glycol unit, and a neopentyl glycol unit.

In terms of controlling the degree of hydrophilicity and hydrophobicity of the compound in a proper range at the time of polymerization, the alkylene glycol unit is preferably a unit of 3 or more carbon atoms, more preferably one or more kinds of units selected from a propylene glycol unit, a tetramethylene glycol unit, an isobutylene glycol unit, and a neopentyl glycol unit, and even more preferably an alkylene glycol unit containing a propylene glycol unit as a main component and in this case, as an accessory component, a different alkylene glycol unit such as neopentyl glycol or the like and bisphenol A and bisphenol F may be contained in the main chain.

As the same radically polymerizable functional groups, one kind group selected from a (meth)acrylate group and an allyl group is preferable since the effect of the present invention can be sufficiently exerted and a (meth)acrylate group is more preferable and an acrylate group is even more preferable. It is supposed that because the polyfunctional monomer has the same functional group as the radically polymerizable functional group (acrylate group) which is possessed by the main component (alkyl acrylate having an alkyl group of 2 to 18 carbon atoms) of the core-constituting component, the polyfunctional monomer can easily be polymerized with the main component and thus the grafting points on which the shell will graft are hardly formed.

The combination of the different radically polymerizable functional groups is preferably a combination of a (meth) acrylate group and an allyl group and more preferably a combination of an acrylate group and an allyl group. It is supposed that because the polyfunctional monomer has a functional group (allyl group) different from the radically polymerizable functional group (acrylate group) which is possessed by the main component (alkyl acrylate having an alkyl group of 2 to 18 carbon atoms) of the core-constituting component, the functional group (allyl group) is not polymerized with the main component at the time of polymerization of the core-constituting components and thus the grafting points on which the shell will graft tend to remain easily.

In this specification, (meth)acrylate means acrylate and/or methacrylate.

(Free Polymers)

The weight-average molecular weight of the free polymers of the invention is required to be 500,000 or higher, preferably 600,000 to 1,200,000, and more preferably 700,000 to 1,200,000 to exhibit the good gloss of a molded article, and the free polymers are components soluble in methyl ethyl ketone and insoluble in methanol of the core-shell polymer composition (b) of the invention. That is, it is apparent that the molecular weight of the graft component of the core-shell polymer composition (b) of the present invention can also be evaluated in accordance with the weight-average molecular weight in terms of polystyrene of the free polymers of the invention measured by gel permeation chromatography (GPC) according to the method described below in "Measurement of molecular weight of free polymers".

The content of the free polymers is preferably 5% to 20%, more preferably 7% to 16%, furthermore preferably 8% to 15%, and even more preferably 8% to 12% in the core-shell polymer composition (b). In such a manner, it is supposed that the high surface gloss of a molded body can be obtained without causing a significant effect of the constituting component ratio of the core-shell polymer composition.

(Shell-Constituting Component)

In terms of attainment of good surface gloss of a molded article, the shell-constituting component of the invention preferably contains 50% to 100% by weight of methyl methacrylate, 0% to 50% by weight of an alkyl acrylate having an alkyl group of 2 to 18 carbon atoms, and 0% to 20% by weight of a monomer copolymerizable with methyl methacrylate and/or the alkyl acrylate, the total amount of which is 100% by weight.

(Alkyl Acrylate having an Alkyl Group of 2 to 18 Carbon Atoms)

Representative examples of the alkyl acrylate having an alkyl group of 2 to 18 carbon atoms which is the core-constituting component or the shell-constituting component described above include ethyl acrylate, propyl acrylate, butyl acrylate, 2-ethylhexyl acrylate, 4-hydroxybutyl acrylate, octyl acrylate, dodecyl acrylate, stearyl acrylate and the like.

(Monomer Copolymerizable with the Alkyl Acrylate and/or the Polyfunctional Monomer and/or Methyl Methacrylate)

Examples of the monomer copolymerizable with the alkyl acrylate and/or the polyfunctional monomer and/or methyl methacrylate which are the core-constituting components or the shell-constituting components described above are preferably at least one selected from the group consisting of alkyl methacrylate having an alkyl group; alkyl methacrylates having a hydroxyl group, or an alkoxyl group; vinyl arenes, vinyl carboxylic acids, vinyl cyanides, vinyl halides, vinyl acetate, and alkenes.

Examples of the alkyl methacrylates having an alkyl group include methyl methacrylate, ethyl methacrylate, butyl methacrylate, 2-ethylhexyl methacrylate, 2-hydroxyethyl methacrylate, dodecyl methacrylate, stearyl methacrylate, behenyl methacrylate and the like.

Examples of the vinyl arenes include styrene, α-methyl styrene, monochlorostyrene, dichlorosryrene and the like.

Examples of the vinyl carboxylic acids include acrylic acid, methacrylic acid and the like. Examples of the vinyl cyanides include acrylonitrile, methacrylonitrile and the like. Examples of the vinyl halides include vinyl chloride, vinyl bromide, chloroprene and the like. Examples of the alkenes include ethylene, propylene, butene, butadiene, isobutene and the like.

In terms of weather resistance, preferably, the monomer does not include a conjugate diene type monomer. These monomers may be used alone or as a combination of two or more.

EXAMPLES

Next, the invention will be described in more detail with reference to Examples; however it should not be intended that the scope of the invention is limited only to such Examples.

Example 1

(Production of Core-Shell Polymer Composition A-1)

A glass reactor equipped with a thermometer, a stirrer, a reflux condenser, a nitrogen inlet port, and an apparatus for adding monomers and an emulsifier was loaded with 2500 g of deionized water and 60 g of a 1.0 wt % aqueous sodium lauryl sulfate solution, and the mixture was heated to 50° C. with stirring under nitrogen stream.

Next, a monomer mixture containing 10 g of butyl acrylate (hereinafter, referred to as BA), 10 g of styrene (hereinafter, referred to as St), 4 g of a 10 wt % aqueous sodium lauryl sulfate solution, and 60 g of deionized water was loaded in form of an emulsion thereto.

Then, 0.5 g of cumene hydroperoxide was loaded thereto and after 10 minutes, a mixed solution obtained by dissolving 0.02 g of disodium ethylenediamine tetraacetate and 0.006 g of ferrous sulfate heptahydrate in 25 g of deionized water, and 30 g of a 5 wt % formaldehyde sulfoxylic acid sodium salt were added. After the resulting mixture was stirred for 30 minutes in this state, 2.5 g of cumene hydroperoxide was loaded and further the stirring was continued for 30 minutes.

Then, 260 g of a 3 wt % aqueous potassium persulfate solution (hereinafter, referred to as KPS) was loaded thereto, and a monomer mixture of 1480 g of BA and 26.6 g of polypropylene glycol diacrylate (hereinafter, referred to as PPG(12)DA) containing propylene glycol chains having an average repeating units of 12 as main chain was dropwise added for 4.5 hours. Furthermore, simultaneously with the addition of the monomer mixture, 35 g of a 10 wt % aqueous sodium lauryl sulfate solution was continuously added for 4.5 hours. After completion of the addition of the monomer mixture, 30 g of a 3 wt % aqueous KPS solution was loaded and stirring was continued for 3 hours to obtain an acrylate type polymer with a volume average particle diameter of 0.20 µm measured by Microtrac UPA 150 (available from Nikkiso Co., Ltd.). The polymerization conversion ratio of the monomer components forming the acrylate type polymer was 99.5%.

Thereafter, to polymerize a shell for a core of the acrylate type polymer, a monomer mixture of 285 g of methyl methacrylate (hereinafter, referred to as MMA) and 15 g of BA, as a monomer for constituting a shell, was continuously added thereto for 10 minutes. After completion of the addition, 60 g of a 1.0 wt % aqueous KPS solution was loaded and stirring was continued for 30 minutes. Successively, a mixture of monomers comprised of 190 g of MMA and 10 g of BA was continuously added thereto over 60 minutes. After 30 minutes from completion of the addition, 10 g of a 1.0 wt % aqueous KPS solution was loaded and stirring was continued further for 1 hour to complete the polymerization. The polymerization conversion ratio of the total monomer components was 99.8% after completion of the polymerization. As described above, a latex of a core-shell polymer composition A-1 consisting of 75 wt % of a core component and 25 wt % of a shell component was obtained.

(Production of White Resin Powder B-1 of Core-Shell Polymer Composition A-1)

The latex of the core-shell polymer composition (A-1) was added to 6000 g of a 2 wt % aqueous calcium chloride solution to obtain a slurry containing coagulated latex particles. Thereafter, the slurry of the coagulated latex particles was heated to 95° C., dewatered, and dried to obtain a white resin powder B-1 of the core-shell polymer composition A-1.

(Preparation of Thermoplastic Resin Composition C-1)

A thermoplastic resin composition C-1 was obtained by blending 100 parts by weight of a vinyl chloride resin (Kanevinyl S-1001, available from Kaneka Corporation), 1.5 parts by weight of a methyl tin mercapto type stabilizer (TM-181 FSJ, available from Katsuta Kako K.K.) as an organotin type stabilizer, 1.0 part by weight of paraffin wax (Rheolub 165, available from Rheochem), 1.2 parts by weight of calcium stearate (SC-100, available from Sakai Chemical Industry Co., Ltd.), 0.1 parts by weight of oxidized polyethylene wax (ACPE-629A, available from Allied Signal Co., Ltd.), 5.0 parts by weight of calcium carbonate (Hydrocarb 95T, available from Omya), 10 parts by weight of titanium oxide (TITON R-62N, available from Sakai Chemical Industry Co., Ltd.), 1.5 parts by weight of a processing aid (KANE ACE PA-20, available from Kaneka Corporation), and 5.0 parts by weight of the white resin powder B-1 of the core-shell polymer composition A-1 with a Henschel mixer.

(Preparation and Evaluation of Molded Article)

The obtained thermoplastic resin composition C-1 was molded into a window frame using a 65 mm anisotropic parallel twin-screw extruder (available from Battenfeld) in the following conditions: molding temperature condition C1/C2/C3/C4/AD/D1/D2/D3/D4=195° C./195° C./193° C./190° C./190° C./200° C./200° C./200° C./200° C. (C1 to C4: cylinder temperature; AD: adapter temperature; D1 to D4: dice temperature), 20 rpm of the screw rotation speed, 95 rpm of the feeder rotation speed; and 100 kg/hr of the discharge amount.

Using a gloss meter available from BYK Gardner, average values of reflectance of 60° light beam for the top surfaces and lower surfaces of the obtained window frame molded articles were calculated to evaluate the surface gloss.

Specimens with 3 cm square were cut out from the obtained window frame molded articles to measure Gardner impact strength. Gardner test was carried out in a thermostatic chamber at −20° C. using an 8-pound weight.

(Measurement of Component Content and Molecular Weight of the Free Polymers)

The obtained white resin powder B-1 in an amount of 2 g was swollen in about 100 g of methyl ethyl ketone, which is an extraction solvent for free polymers, and centrifuged. After the centrifugation, a methyl ethyl ketone solution obtained by removing insoluble precipitates and concentrating the supernatant to about 10 g was added to 200 ml of methanol and a small amount of an aqueous calcium chloride solution was added and stirred to recover free polymers, which were precipitates crystallized as components insoluble in methanol. The obtained free polymers were taken out by filtration and subjected to weight measurement to find that the weight was 0.2 g (content in the core-shell polymer composition: 10% by weight). A free polymer tetrahydrofuran solution obtained by dissolving about 20 mg of the free polymers in 10 ml of tetrahydrofuran was subjected to weight-average molecular weight measurement for the precipitates (components soluble in methyl ethyl ketone and insoluble in methanol) by using HLC-8220 GPC (available from Tosoh Corporation). A polystyrene gel column TSKgel Super HZM-H (available from Tosoh Corporation) was used as a column, tetrahydrofuran was used as an eluent, and analysis was carried out in terms of polystyrene.

Comparative Example 1

(Production of Core-Shell Polymer Composition A-2)

A core-shell polymer composition A-2 was produced by the same method as in Example 1, except that 4.0 g of allyl methacrylate (hereinafter, referred to as AMA) was used in place of 26.6 g of PPG(12)DA. The volume average particle diameter of the acrylate type polymer to be the core was 0.20 µm and the polymerization conversion ratio of the monomer components forming the acrylate type polymer was 99.8%. As described above, a latex of a core-shell polymer composition A-2 consisting of 75 wt % of a core component and 25 wt % of a shell component was obtained. The polymerization conversion ratio of the total monomer components was 99.7% after completion of the polymerization.

(Production of White Resin Powder B-2 of Core-Shell Polymer Composition A-2)

A white resin powder B-2 of the core-shell polymer composition A-2 was obtained in the same manner as in Example 1, except that the latex of the core-shell polymer composition A-2 was used.

(Preparation of Thermoplastic Resin Composition C-2)

A thermoplastic resin composition C-2 was obtained in the same manner as in Example 1, except that 5.0 parts by weight of the white resin powder B-2 of the core-shell polymer composition A-2 was used.

(Preparation and Evaluation of Molded Article)

Window frame molded articles were prepared by the same method as in Example 1 using the obtained thermoplastic resin composition C-2, and the surface gloss, and Gardner impact strength were evaluated by the same method as in Example 1.

(Measurement of Free Polymer Molecular Weight)

Using the thermoplastic resin composition C-2, the weight-average molecular weight of components soluble in methyl ethyl ketone and insoluble in methanol was measured by the same method as in Example 1.

Table 1 shows the structures of the core-shell polymer compositions of Examples 1 and Comparative Example 1, and evaluation results of the molded articles obtained by compounding them to the thermoplastic resin; that is, the measurement results of the surface gloss, and Gardner impact strength.

monomers, and the polyfunctional monomers are comprised of the compounds each having a plurality of same radically polymerizable functional groups in the molecule thereof.

Example 2

(Production of Core-Shell Polymer Composition A-3)

A core-shell polymer composition A-3 was produced in the same manner as in Example 1, except that 11.0 g of polytetramethylene glycol diacrylate (hereinafter, referred to as PTMG(3)DA) containing a tetramethylene glycol chain having an average repeating units of 3 as a main chain was used in place of 26.6 g of PPG(12)DA. The volume average particle diameter of the acrylate type polymer to be the core was 0.20 μm and the polymerization conversion ratio of the monomer components constituting the acrylate type polymer was 99.6%. In the above-mentioned manner, a latex of the core-shell polymer composition A-3 comprised of 75% by weight of the core component and 25% by weight of the shell component was obtained. The polymerization conversion ratio of the entire monomer components was 99.9% after completion of the polymerization.

(Production of White Resin Powder B-3 of Core-Shell Polymer Composition A-3)

A white resin powder B-3 of the core-shell polymer composition A-3 was obtained in the same manner as in Example 1, except that the latex of the core-shell polymer composition A-3 was used.

TABLE 1

| | structure of core shell polymer composition | | | | evaluation result | |
|---|---|---|---|---|---|---|
| Number | core/shell ratio | core composition | shell composition | molecular weight of the component soluble in MEK and insoluble in MeOH | particle diameter of the core polymer [μm] | gloss [%] | Gardner impact strength [inchlbs/mil] |
| Example 1 | 75/25 | BA (73.5) St (0.5) PPG(12)DA (1.3) | MMA (23.4) BA (1.2) | 800000 | 0.20 | 48.2 | 2.0 |
| Comparative Example 1 | 75/25 | BA (74.5) St (0.5) AMA (0.2) | MMA (23.7) BA (1.2) | 650000 | 0.20 | 37.6 | 1.9 |

In Table 1 (similar to Table 2 below), the numeral values in the parentheses described in the ends of the respective monomer components are the polymerization ratios of the respective monomer components in the core or the shell. Consequently, the contents of the respective monomer components in the core can be calculated by dividing respective polymerization ratio by the total of the polymerization ratios. For example, the BA content in the core in Example 1 is 100× 73.5/(73.5+0.5+1.3)=97.6% by weight. Further, the ratio of the total values of the polymerization ratios of the respective monomer components in the core or the shell means the core/shell ratio.

Based on comparison of Example 1 and Comparative Example 1, it can be understood that high impact resistance and good surface gloss of a molded body can be obtained in a case where the core-shell polymer composition (b) is obtained by polymerizing the shell-constituting components in the presence of a core obtained by polymerizing a monomer mixture (100% by weight in total) of 70% to 99.95% by weight of alkyl acrylates having an alkyl group of 2 to 18 carbon atoms, 0.05% to 10% by weight of polyfunctional monomers, and 0% to 20% by weight of monomers copolymerizable with the alkyl acrylates and the polyfunctional (Preparation of Thermoplastic Resin Composition C-3)

A thermoplastic resin composition C-3 was obtained in the same manner as in Example 1, except that 5.0 parts by weight of the white resin powder B-3 of the core-shell polymer composition A-3 was used.

(Preparation and Evaluation of Molded Body)

A window frame molded body was prepared using the obtained thermoplastic resin composition C-3 in the same manner as in Example 1 and the surface gloss thereof was evaluated in the same manner as in Example 1.

(Measurement of Free Polymer Molecular Weight)

Using the thermoplastic resin composition C-3, the weight-average molecular weight of components soluble in methyl ethyl ketone and insoluble in methanol was measured by the same method as in Example 1.

Example 3

(Production of Core-Shell Polymer Composition A-4)

A core-shell polymer composition A-4 was produced in the same manner as in Example 1, except that 11.0 g of PTMG (3)DA and 0.8 g of allyl methacrylate (hereinafter, referred to as AMA) were used in place of 26.6 g of PPG(12)DA. The volume average particle diameter of the acrylate type polymer to be the core was 0.20 μm and the polymerization conversion ratio of the monomer components constituting the acrylate type polymer was 99.6%. In the above-mentioned manner, a latex of the core-shell polymer composition A-4 comprised of 75% by weight of the core component and 25% by weight of the shell component was obtained. The polymerization conversion ratio of the entire monomer components was 99.9% after completion of the polymerization.
(Production of White Resin Powder B-4 of Core-Shell Polymer Composition A-4)

A white resin powder B-4 of the core-shell polymer composition A-4 was obtained in the same manner as in Example 1, except that the latex of the core-shell polymer composition A-4 was used.
(Preparation of Thermoplastic Resin Composition C-4)

A thermoplastic resin composition C-4 was obtained in the same manner as in Example 1, except that 5.0 parts by weight of the white resin powder B-4 of the core-shell polymer composition A-4 was used.
(Preparation and Evaluation of Molded Body)

A window frame molded body was prepared using the obtained thermoplastic resin composition C-4 in the same manner as in Example 1 and the surface gloss thereof was evaluated in the same manner as in Example 1.
(Measurement of Free Polymers Molecular Weight)

Using the thermoplastic resin composition C-4, the weight-average molecular weight of the components soluble in methyl ethyl ketone and insoluble in methanol was measured in the same manner as in Example 1.

Table 2 shows the structures of the core-shell polymer compositions obtained in Examples 2, 3 and Comparative Example 1, evaluation results of molded bodies obtained by mixing the compositions to the thermoplastic resin, that is, the measurement results of surface gloss.

TABLE 2

| | core/shell ratio | core composition | shell composition | content of the component soluble in MEK and insoluble in MeOH | molecular weight of the component soluble in MEK and insoluble in MeOH | particle diameter of the core polymer [μm] | gloss [%] |
|---|---|---|---|---|---|---|---|
| Example 2 | 75/25 | BA (74.1) St (0.5) PTMG(3)DA (0.5) | MMA (23.6) BA (1.2) | 14.1% | 1200000 | 0.20 | 50.3 |
| Example 3 | 75/25 | BA (74.1) St (0.5) PTMG(3)DA (0.5) AMA (0.04) | MMA (23.6) BA (1.2) | 9.3% | 900000 | 0.20 | 45.9 |
| Comparative Example 1 | 75/25 | BA (74.5) St (0.5) AMA (0.2) | MMA (23.7) BA (1.2) | 5.4% | 650000 | 0.20 | 37.6 |

Comparison of Examples 2, 3 and Comparative Example 1 makes it clear that good surface gloss of a molded body can be obtained in a case where the core-shell polymer composition (b) is obtained by polymerizing the shell-constituting components in the presence of a core obtained by polymerizing a monomer mixture (100% by weight in total) of 70% to 99.95% by weight of alkyl acrylates having an alkyl group of 2 to 18 carbon atoms, 0.05% to 10% by weight of polyfunctional monomers, and 0% to 20% by weight of monomers copolymerizable with the alkyl acrylates and the polyfunctional monomers, 100% by weight of the polyfunctional monomers consists of 51% to 100% by weight of compounds having a plurality of same radically polymerizable functional groups in the molecule thereof and 0% to 49% by weight of compounds having a plurality of different radically polymerizable functional groups in the molecule thereof.

The invention claimed is:

1. A thermoplastic resin composition comprising 100 parts by weight of a thermoplastic resin (a) and 0.5 to 30 parts by weight of a core-shell polymer composition (b), wherein the core-shell polymer composition (b) is obtained by polymerizing a shell-constituting component in the presence of a core obtained by polymerizing a core-constituting component, the core-constituting component contains 70% to 99.95% by weight of an alkyl acrylate having an alkyl group of 2 to 18 carbon atoms, 0.05% to 10% by weight of a polyfunctional monomer, and 0% to 20% by weight of a monomer copolymerizable with the alkyl acrylate and/or the polyfunctional monomer, the total amount of which is 100% by weight, 100% by weight of the polyfunctional monomer consists of 51% to 100% by weight of a compound having a plurality of same radically polymerizable functional groups in the molecule thereof and 0% to 49% by weight of a compound having a plurality of different radically polymerizable functional groups in the molecule thereof, the molecular weight of a component soluble in methyl ethyl ketone and insoluble in methanol of the core-shell polymer composition (b) is 700,000 to 1,200,000, and the content of the component is 5% to 20% in the core-shell polymer composition (b).

2. The thermoplastic resin composition according to claim 1, wherein a main chain of the compound having a plurality of same radically polymerizable functional groups in the molecule thereof has a repeating structure composed mainly of alkylene glycol units and the number of repeating units of the repeating structure is 3 or higher in average.

3. The thermoplastic resin composition according to claim 1, wherein the compound having a plurality of different radically polymerizable functional groups in the molecule thereof has an allyl group.

4. The thermoplastic resin composition according to claim 1, wherein the core-shell polymer composition (b) contains 50% to 95% by weight of the core-constituting component and 5% to 50% by weight of the shell-constituting component, based on the total amount of the core-shell polymer composition (b) being 100% by weight.

5. The thermoplastic resin composition according to claim 1, wherein the thermoplastic resin (a) is a vinyl chloride based resin.

6. A molded article obtained by molding the thermoplastic resin composition according to claim 5.

7. The molded article according to claim 6, wherein the molded article is a window frame or a door frame.

8. The molded article according to claim 6, wherein the molded article is a siding.

\* \* \* \* \*